United States Patent Office.

CARL F. L. LIMPACH, OF HÖCHST-ON-THE-MAIN, GERMANY, ASSIGNOR TO FARBWERKE, VORMALS MEISTER, LUCIUS & BRÜNING, OF SAME PLACE.

MANUFACTURE OF COLORING-MATTER.

SPECIFICATION forming part of Letters Patent No. 268,506, dated December 5, 1882.

Application filed June 22, 1882. (Specimens.) Patented in France May 27, 1882, No. 137,109, and in England May 30, 1882, No. 2,544.

*To all whom it may concern:*

Be it known that I, CARL FRIEDRICH LEONHARD LIMPACH, Doctor of Philosophy, of Höchst-on-the-Main, Germany, have invented certain new and useful Improvements in Coloring-Matters; and I do hereby declare that the following is a full, clear, and exact description of the invention, which will enable others skilled in the art to which it appertains to make and use the same.

The object of my invention is the production of a red coloring-matter by acting with the sodium salt of the beta-naphthol trisulphonic acid upon the diazo compound derived from the alphanaphthylamine sulphonic acid.

In order to produce the trisulphonic acid of beta-naphthol discovered by me, I add one part of naphthol to from four to five parts of fuming sulphuric acid (containing twenty per cent. of $SO_3$) in such a manner that the temperature rises up to 284°–320° Fahrenheit, (140°–160° centigrade.) I allow the action to proceed at this temperature until a sample of the product gives, with ammonia, a solution showing a pure green fluorescence and produces a coloring-matter on being left standing with diazoxylol in an alkaline solution. This point having been reached, the mass is in the usual manner converted into the sodium salt of the trisulphonic acid of beta-naphthol.

In order to produce my red coloring-matter with the aid of the trisulphonic acid of beta-naphthol, I first mix 22.3 parts of alphanaphthylamine sulphonic acid with twenty-five parts of hydrochloric acid (containing thirty-three per cent. HCl) and two hundred and fifty parts of water. By then treating the paste thus obtained with 6.9 parts of nitrite of sodium I convert the alphanaphthylamine sulphonic acid into its diazo compound. I then prepare a solution of fifty parts of the beta-naphthol trisulphonate of sodium in two hundred and fifty parts of water, add to it twenty parts of aqueous ammonia, (containing twenty-four per cent. $NH_3$,) and now I allow the diazo compound of the alphanaphthylamine sulphonic acid produced in the above-described manner to flow slowly into this solution. The greatest part of the coloring-matter separates in form of voluminous precipitate, which is purified by dissolving it in water and precipitating it by means of common salt.

By dissolving the coloring-matter in concentrated sulphuric acid a solution of violet shade is obtained, which after standing for some time turns red.

When boiled with tin and muriatic acid the coloring-matter is destroyed.

What I claim as new, and wish to secure by Letters Patent, is—

1. The herein-described process for producing a red coloring-matter, which consists in the reaction, with sodium salt, of the beta-naphthol trisulphonic acid upon the diazo compound derived from alphanaphthylamine sulphonic acid, substantially as set forth.

2. The red coloring-matter described, produced from beta-naphthol trisulphonic acid and the diazo compound of the alphanaphthylamine sulphonic acid, in the manner substantially as set forth, or by any other means that will produce a like result.

In testimony that I claim the foregoing as my own I affix my signature in presence of two witnesses.

CARL FRIEDRICH LEONHARD LIMPACH.

Witnesses:
    F. VOGELER,
    A. S. HOGUE.